US005955718A

United States Patent [19]

Levasseur et al.

[11] Patent Number: 5,955,718

[45] **Date of Patent: *Sep. 21, 1999**

[54] INTEGRATED CREDIT/INFORMATION EXCHANGE MODULE

[75] Inventors: Joseph L. Levasseur, Chesterfield; James C. Douglass, St. Louis, both of Mo.

[73] Assignee: Coin Acceptors, Inc., St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/540,582

[22] Filed: Oct. 6, 1995

[51] Int. Cl.[6] .......... G06K 7/08

[52] U.S. Cl. .......... 235/381; 235/382; 235/488

[58] Field of Search .......... 235/488, 381, 235/382

[56] References Cited

U.S. PATENT DOCUMENTS

| | | | |
|---|---|---|---|
| D. 294,718 | 3/1988 | Morgan, Jr. | D20/8 |
| D. 297,740 | 9/1988 | Morgan, Jr. | D20/8 |
| 3,768,616 | 10/1973 | Dykehouse et al. | 194/4 R |
| 4,023,012 | 5/1977 | Ano et al. | 235/61.7 |
| 4,167,104 | 9/1979 | Bond | 70/208 |
| 4,231,105 | 10/1980 | Schuller et al. | 364/900 |
| 4,414,768 | 11/1983 | Bachmann et al. | 40/584 |
| 4,454,670 | 6/1984 | Bachmann et al. | 40/584 |
| 4,572,946 | 2/1986 | Schrenk | 235/380 |
| 4,575,622 | 3/1986 | Pellegrini | 235/382 |
| 4,613,176 | 9/1986 | Kelly | 292/201 |
| 4,669,596 | 6/1987 | Capers et al. | 235/381 |
| 4,682,709 | 7/1987 | Brandes et al. | 221/2 |
| 4,767,917 | 8/1988 | Ushikubo | 364/479 |
| 4,778,983 | 10/1988 | Ushikubo | 235/381 |
| 4,880,097 | 11/1989 | Speas | 194/200 |
| 4,884,212 | 11/1989 | Stutsman | 364/479 |
| 4,895,238 | 1/1990 | Speas | 194/319 |
| 4,967,895 | 11/1990 | Speas | 194/200 |
| 4,999,601 | 3/1991 | Gervais | 235/488 |
| 5,019,697 | 5/1991 | Postman | 235/441 |
| 5,027,283 | 6/1991 | Phillips et al. | 364/479 |
| 5,091,713 | 2/1992 | Horne et al. | 340/541 |

(List continued on next page.)

FOREIGN PATENT DOCUMENTS

| | | | |
|---|---|---|---|
| 3435697 | 4/1986 | Germany | 235/381 |
| 3620755 | 12/1987 | Germany | 235/381 |
| 3628253 | 2/1988 | Germany | 235/381 |
| 2206107 | 12/1988 | United Kingdom | 235/381 |
| 9745813 | 12/1997 | WIPO . | |

OTHER PUBLICATIONS

Translation of DE 36 28 253 A1 by Translation Aces, Inc. Feb. 25, 1988.

BA30 Bill Acceptor, Operation and Service Manual, Coin Acceptors, Inc., Sep. 1994.

Multi–drop Bus Information, Coin Acceptors, Inc., May 18, 1994.

*Primary Examiner*—Thien Minh Le
*Assistant Examiner*—Douglas X. Rodriguez
*Attorney, Agent, or Firm*—Haverstock, Garrett & Roberts

[57] ABSTRACT

An integrated credit/information exchange module includes a bill examination portion, a card examination portion, a display portion, and a data entry portion connected to and controlled by a processor portion. The integrated module also includes a modular housing and faceplate configured for simple retrofit installation into existing vending machines having bill acceptor slots to overcome the space limitations of such vending machines. The faceplate includes a bill insertion opening, a card insertion opening, a display screen, and a set of data entry keys located thereon. Bill examination, card examination, and advanced vending machine features such as data retrieval, reprogramming, card revaluation, smart message displays, and control operations are provided through programming of the processor portion.

32 Claims, 14 Drawing Sheets

U.S. PATENT DOCUMENTS

| | | | |
|---|---|---|---|
| 5,092,445 | 3/1992 | Kozima | 194/206 |
| 5,132,915 | 7/1992 | Goodman | 364/479 |
| 5,147,021 | 9/1992 | Maruyama et al. | 194/217 |
| 5,169,027 | 12/1992 | Falk et al. | 221/2 |
| 5,192,855 | 3/1993 | Insulander et al. | 235/381 |
| 5,286,957 | 2/1994 | Defrasne | 235/441 |
| 5,290,033 | 3/1994 | Bittner et al. | 273/138 A |
| 5,303,844 | 4/1994 | Moehlberger | 235/381 |
| 5,310,173 | 5/1994 | Martinez | 271/198 |
| 5,317,138 | 5/1994 | Togawa | 235/440 |
| 5,339,239 | 8/1994 | Manabe et al. | 364/401 |
| 5,344,046 | 9/1994 | Maldanis et al. | 222/2 |
| 5,360,093 | 11/1994 | Baer | 194/206 |
| 5,450,938 | 9/1995 | Rademacher | 194/206 |
| 5,477,041 | 12/1995 | Miron et al. | 235/382 |
| 5,489,014 | 2/1996 | Menoud | 194/211 |
| 5,566,809 | 10/1996 | Vogt et al. | 194/348 |

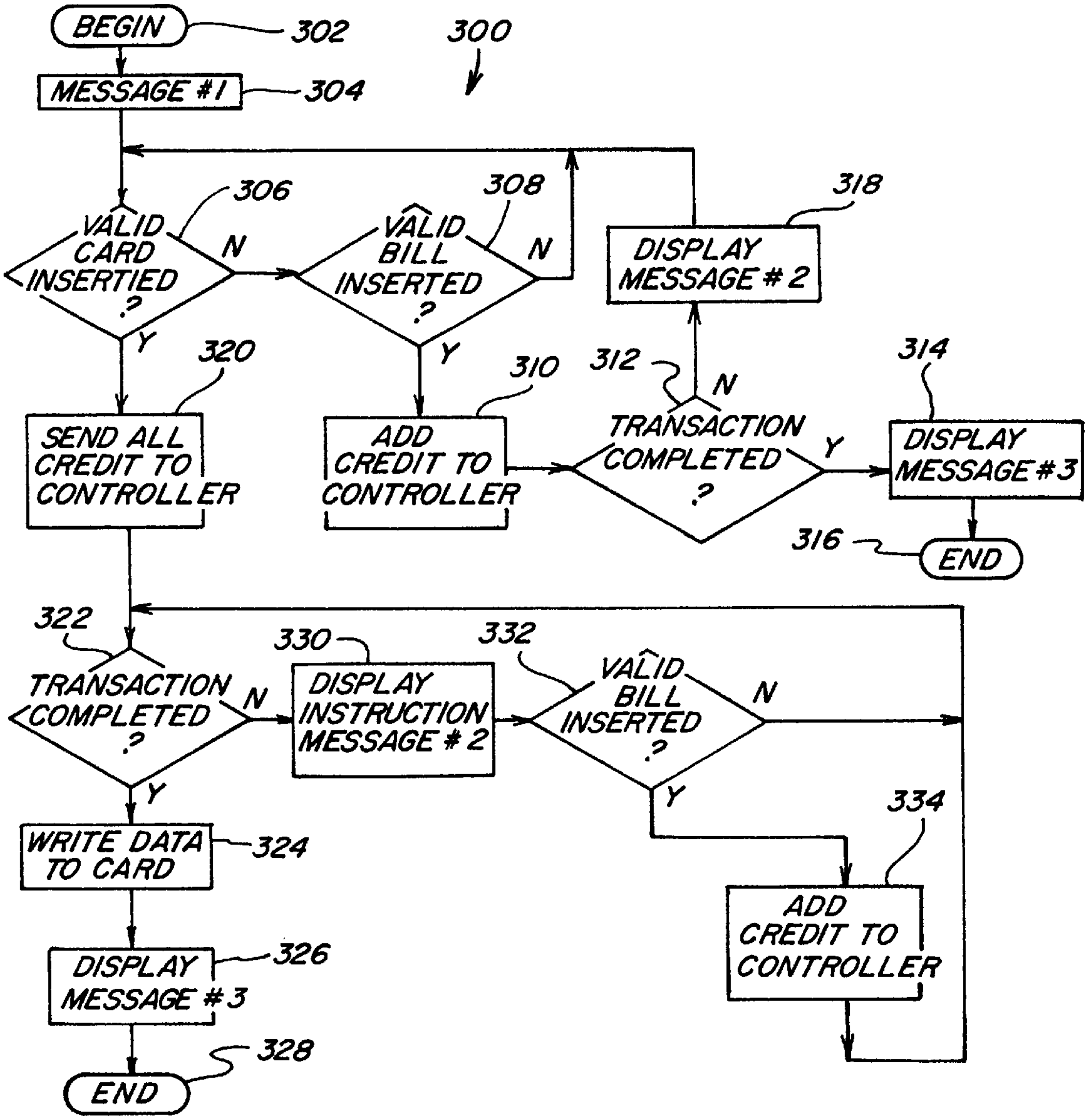

MESSAGE #1: INSERT COINS, BILLS, OR CASH CARD; ADD BILLS OR COINS TO CASH CARD

MESSAGE#2: MAKE SELECTION; INSUFFICIENT CREDIT; ADD MORE CREDIT USING COINS OR BILLS

MESSAGE#3: PRODUCT HAS DELIVERIED; TRANSACTION COMPLETED

OTHER MESSAGES:
CONVERT YOUR COINS TO CARD BY INSERTING CARD THEN COINS; CONVERT YOUR BILLS TO CARD BY INSERTING CARD THEN BILLS; BILL WAS INSERTED UPSIDE DOWN; INSERT CASH CARD, BILLS, OR COINS; USE EXACT CHANGE ONLY; MAKE ANOTHER SELECTION; THANK YOU FOR CHOOSING DIET COKE; SETUP & DIAGNOSTIC MESSAGES

Fig. 14

MESSAGE # 1 CARD HAS ONLY XX CENTS
ADD BILLS TO CARD
OR USE COINS ONLY

MESSAGE # 2 REINSERT CARD FOR ADDITIONAL $1

MESSAGE #3 PRODUCT HAS DELIVERED

OTHER MESSAGES MAKE SELECTION; INSERT CASH CARD, BILLS, OR COINS; USE EXACT CHANGE ONLY; BILL INSERTED BACKWARDS; BILL INSERTED UPSIDE DOWN

INTEGRATED CREDIT/INFORMATION EXCHANGE MODULE

FIELD OF THE INVENTION

This invention relates generally to vending machines and more particularly, to credit devices utilized in such vending machines.

BACKGROUND OF THE INVENTION

Known vending machines such as those disclosed in U.S. Pat. No. Des. 294,718 and U.S. Pat. No. Des. 297,740 typically include a vending machine selection panel having a plurality of selection buttons, a coin inlet slot, a display, a sold out indicator light, a use correct change indicator light, and a coin return lever. Many such vending machines also include a covered bill acceptor slot and a point-of-sale window located near the top of the selection panel. The cover can be removed to facilitate the installation of a bill acceptor, the front face of which typically encompasses the entire bill acceptor slot.

With the increased acceptance of card technologies, in some vending machine applications it is desirable to include a card reader to provide the customer with a variety of purchasing methods. It is known to install a card reader rather than a bill acceptor in the bill acceptor slot. However, installing both devices is complicated and in some cases prevented by the space limitations of the vending machine. Particularly, many known bill acceptors such as the bill acceptor described in U.S. Pat. No. 5,310,173, which is assigned to the present assignee and the specification of which is incorporated herein by reference, include an upward extending housing in which accepted bills are stored. When mounted in a vending machine, the housing extends upward along the inner surface of the vending machine door and prevents positioning the card reader along that portion of the door because there is insufficient depth along the inner surface of the door to accommodate the card reader.

In known vending machines having doors with sufficient depth for the installation of the card reader, the additional space required for the card reader reduces the amount of space available for point-of-sale advertising. Creating a new opening and mounting area for the card reader is also costly due to the additional labor and materials required, and in some vending machines a new door may be required in order to install both devices. Further, installing the card reader above the bill acceptor slot makes it difficult for vending machine customers to reach.

The addition of other vending machine devices only serves to further complicate the aforementioned space limitations. Further, each device added to an existing vending machine requires its own power supply and microprocessor. Such separate power supplies and microprocessors increase the overall size and cost of the vending machine and may reduce overall reliability because there are more components which can malfunction.

Adding separate devices to the vending machine can also cause interface problems because there are numerous interface configurations in existing vending machines. Further, some vending machine controllers are not configured to communicate with devices such as card readers. Thus, the implementation of advanced vending machine features, such as device reprogramming, data retrieval, card revaluation, and control operations has not been possible.

Currently, when a vending machine device is reprogrammed its microprocessor is replaced or physically altered. Both situations require the vending machine to be opened and the particular device to be removed, making such reprogramming operations time consuming and expensive. Known methods of data retrieval require a separate connection on the vending machine which is dedicated to such data retrieval. Particularly, a portable computer may be connected to the vending machine via this connection and data may be transferred from the vending machine to the computer. Further, in known vending machine applications including card readers, the cards utilized are purchased from a central location. When the value of a card is depleted the card is either thrown away or possibly revalued at the central location. Therefore, a card holder must return to the central location in order to increase the value of the card.

Accordingly, it is desirable and advantageous to provide an integrated credit/information exchange module configured to facilitate retrofit installation into existing vending machines, meeting the space requirements of such vending machines in general and meeting the space requirements of vending machine bill acceptor slots in particular. It is also desirable and advantageous to provide an integrated credit/information exchange module which facilitates implementation of advanced vending machine features such as data retrieval, device reprogramming, card revaluation, and control operations.

An important object of the present invention is to provide a device which is capable of both bill examination and card examination and which effectively meets the space limitations of known vending machines.

Another object of the present invention is to provide a device which is capable of both bill examination and card examination and which includes a plurality of interfaces for facilitating connection with and retrofit installation into various vending machine types.

Yet another object of the present invention is to provide a device which is capable of implementing advanced vending machine features as desired for particular applications.

Another object of the present invention is to provide a device capable of both bill examination and card examination and which includes a control interface at which a control signal is produced in response to information encoded on a card.

SUMMARY OF THE INVENTION

These and other objects of the invention are attained by an integrated credit/information exchange module including a modular housing having a faceplate and configured to be installable in a bill acceptor slot in a vending machine. The faceplate includes a bill insertion opening and a card insertion opening thereon as well as a display screen and a set of data entry keys. Accordingly, all user interface portions of the integrated module are positioned on the faceplate which itself is configured for installation in an existing vending machine bill acceptor slot, simplifying installation and meeting vending machine space requirements.

The integrated module includes a bill examination portion, a card examination portion, an interface portion, a display portion, and a data entry portion each of which is connected to a processor portion. The integrated module also includes a power supply which provides power to each portion.

The interface portion includes a plurality of interface configurations for connecting the integrated module to a variety of vending machine types. Particularly, a multi drop bus interface, an L logic interface, and a B.V. bill validator interface, each of which is well known in the vending machine industry, are provided so that the integrated module is alternatively selectively connectable to a multi drop bus, an L logic connector, or a B.V. bill validator connector of a particular vending machine.

Regardless of the type of vending machine into which the integrated module is installed, the processor portion and the bill examination portion are operable with one another to control the examination of a bill inserted into the bill insertion opening and to provide an output signal representative of the value of the bill to the interface portion. Further, the processor portion and the card examination portion are operable with one another to control the examination of a card inserted in the card insertion opening and to provide an output signal in response to the information encoded on the card to the interface portion. Such encoded card information may take the form of a monetary value. The processor portion and the card examination portion are further operable with one another to alter the information encoded on the card inserted in the card insertion opening, such as by increasing or decreasing the monetary value encoded thereon. Particularly, value can be added to the inserted card by placing change due from a transaction on the card, by inserting bills in the bill insertion opening, or, in connection with some vending machines, by adding coins thereto. This feature simplifies the use of a card by the customer, who no longer needs to return to a central location to revalue the card.

Further, data retrieval, reprogramming, and control capabilities are provided by the integrated module. These features increase the options available to the vending machine operator, allowing the operator to retrieve stored data regarding purchases and facilitating the implementation or alteration of vending machine features as may be desirable to the operator. One control operation which is implementable by the integrated module is an electrically controllable locking mechanism for the vending machine door. The processor portion and the card examination portion are operable to produce a signal at a control interface to which the locking mechanism is connected. The signal effects operation of the locking mechanism to allow the vending machine door to be opened when a properly encoded card is inserted in the card insertion opening.

The integrated credit/information exchange module described above is configured for retrofit installation in existing vending machine bill acceptor slots and can be connected to various types of vending machine interfaces. Further, the integrated module is programmable to include advanced vending machine features including card revaluation, data retrieval, device reprogramming, and control operations. Accordingly, the integrated module provides the advantages of space savings, easy installation into new or existing vending machines, and advanced vending machine features as desired by the vending machine operator, all in one integrated device.

BRIEF DESCRIPTION OF THE DRAWINGS

FIG. 14 is a flow chart illustration of processing steps for the integrated credit/information exchange module when installed in the vending machine of FIG. 10;

DETAILED DESCRIPTION OF THE PREFERRED EMBODIMENT

Figure 1:
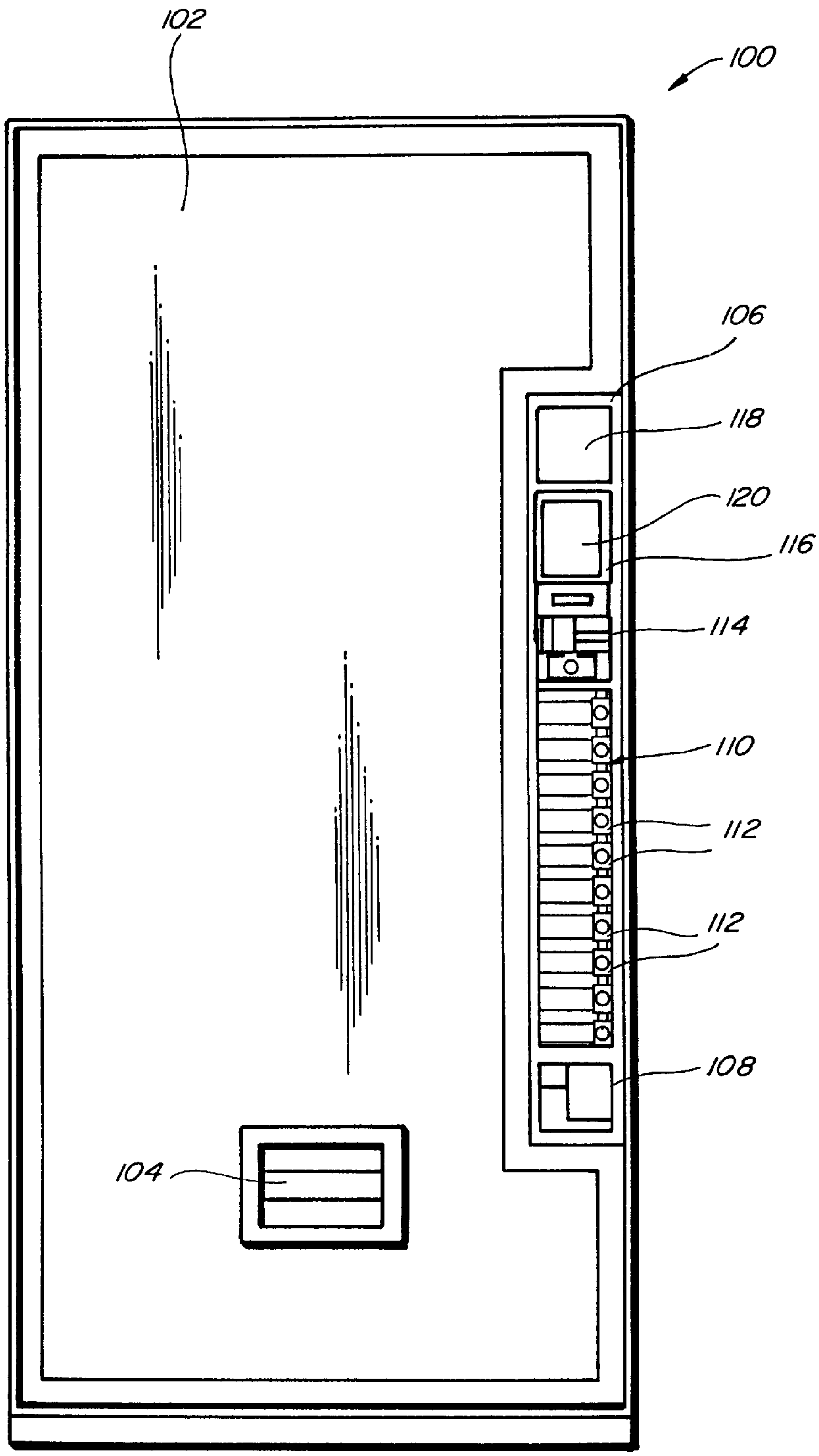
(PRIOR ART) Fig. 1
FIG. 1 is a front view of a typical soft drink vending machine.

FIG. 1 is a front view of a typical soft drink vending machine 100 which includes a large door area 102 which is commonly used as an illuminated sign, and a vend port 104 through which a selected product is dispensed. A recessed panel area 106 includes a coin return area 108 and a vend selection area 110 with a plurality of vend selection buttons 112. Located above the vend selection area 110 are a coin insert area 114, a bill acceptor slot 116, and a point-of-sale window 118. As easily seen in FIG. 1, the space available for the installation of various credit or other devices in the vending machine 100 is rather limited, particularly where the vending machine operator desires not to interfere with the point-of-sale window 118. The vending machine 100 is typically manufactured with a cover 120 provided for bill acceptor slot 116, the cover 120 being easily removable for the installation of a bill acceptor.

Figure 2:
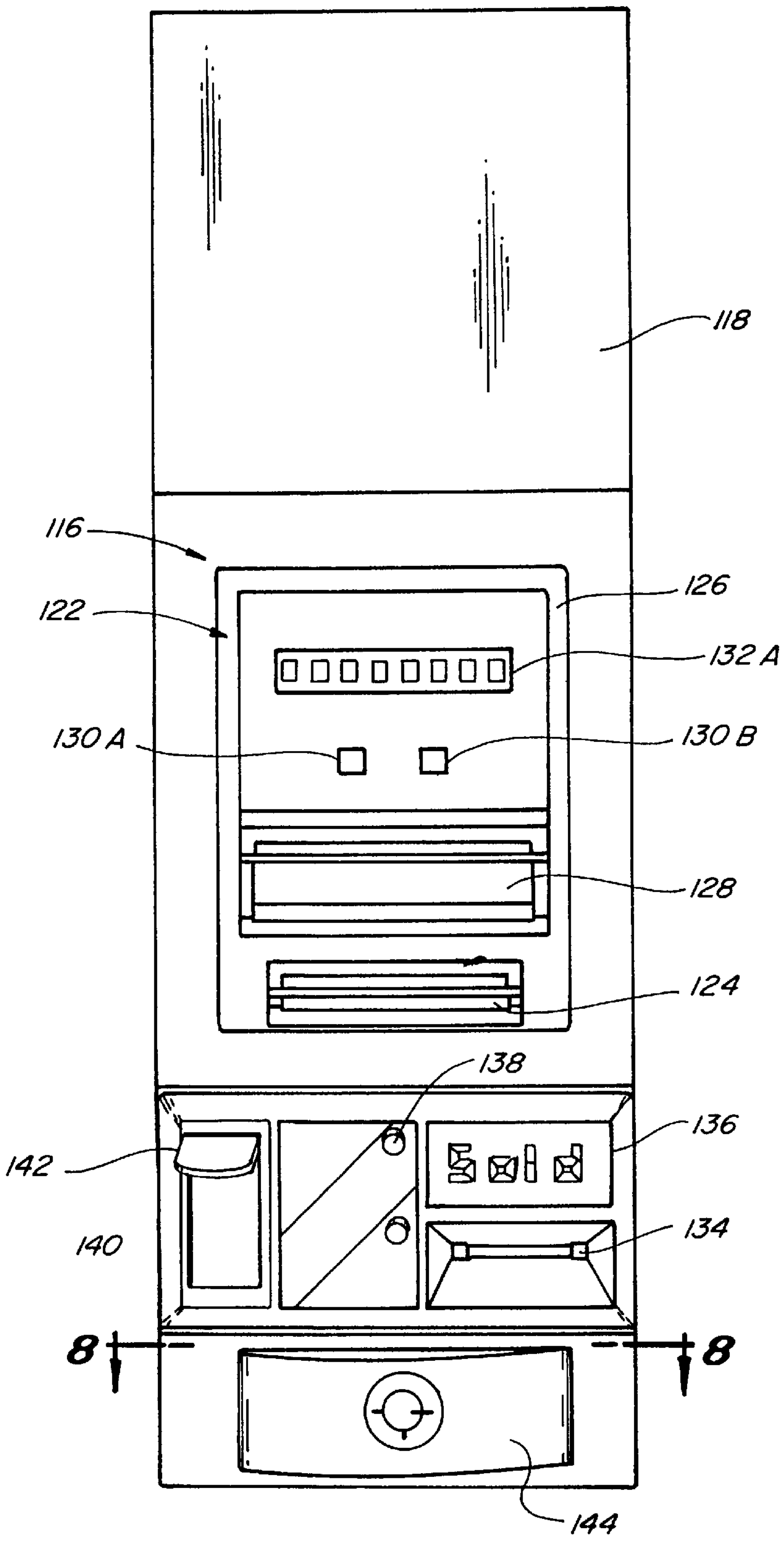
FIG. 2 is a front view of an integrated credit/information exchange module installed in a vending machine bill acceptor slot.

FIG. 2 is a front view of the upper portion of the recessed panel 106 (shown in FIG. 1) including an integrated credit/information exchange module 122 mounted in the bill acceptor slot 116. The integrated module 122 includes a card insertion opening 124 located near the bottom of a faceplate 126 which is configured to fit within the bill acceptor slot 116. A bill insertion opening 128 is located above card insertion opening 124. A pair of data entry keys 130A and 130B, and a display screen 132A are located above the openings 124 and 128. The display screen 132A may be a light emitting diode (LED) display, a liquid crystal display (LCD), or other known type of display. Below the integrated module 122 the recessed panel 106 includes a coin inlet slot 134, a display 136, a sold out indicator light 138, a use correct change indicator light 140, a coin return lever 142, and a door handle assembly 144. The point-of-sale window 118 is located above the integrated module 122 and may be fully utilized even with the integrated module 122 installed.

Figure 3:
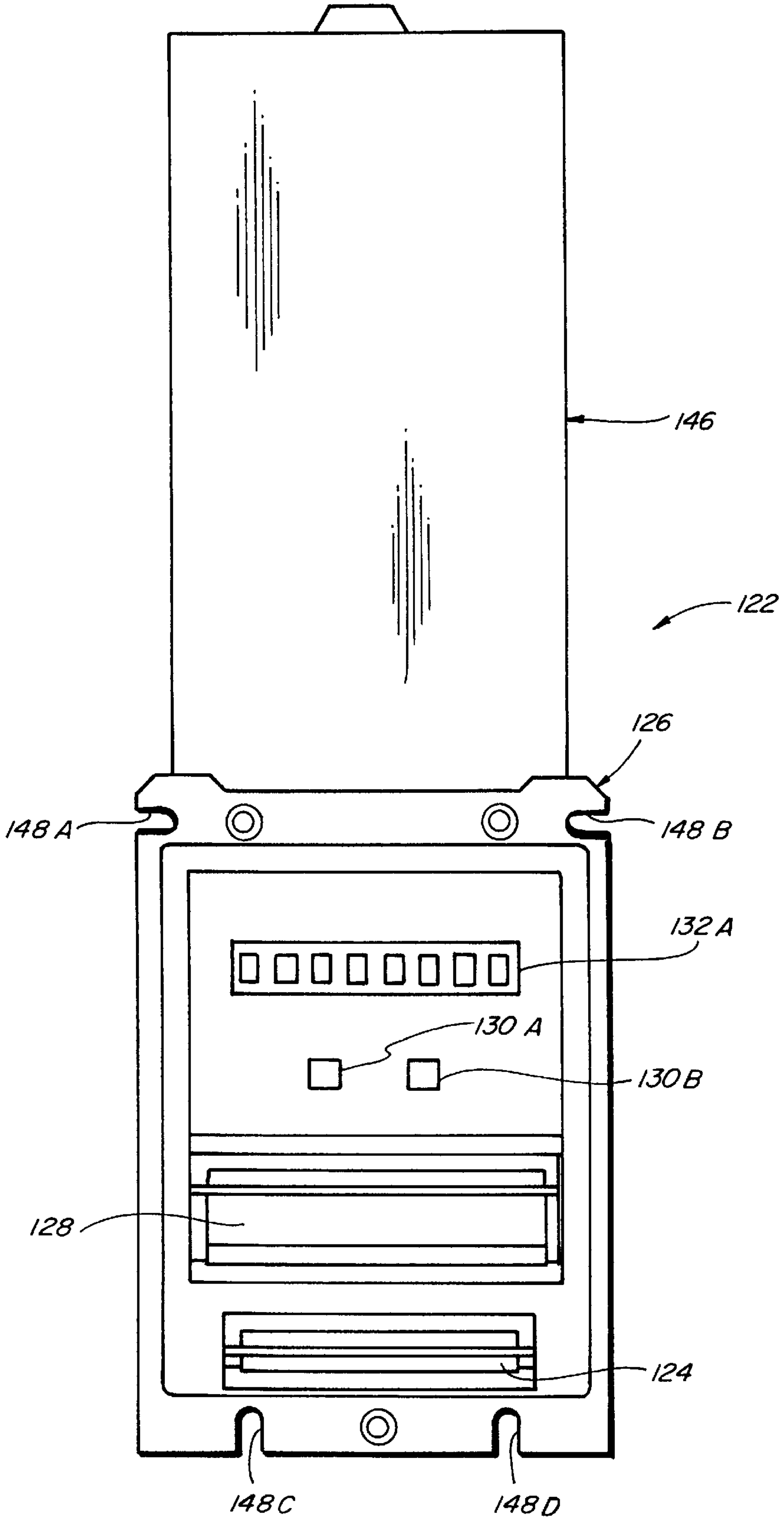
FIG. 3 is a front view of the integrated credit/information exchange module removed from the vending machine.

FIG. 3 is a front view of the integrated module 122 illustrating the faceplate 126 and a rear modular housing 146. The faceplate 126 includes mounting slots 148A, 148B, 148C, and 148D for mounting the integrated module 122 in the bill acceptor slot 116.

Figure 4:
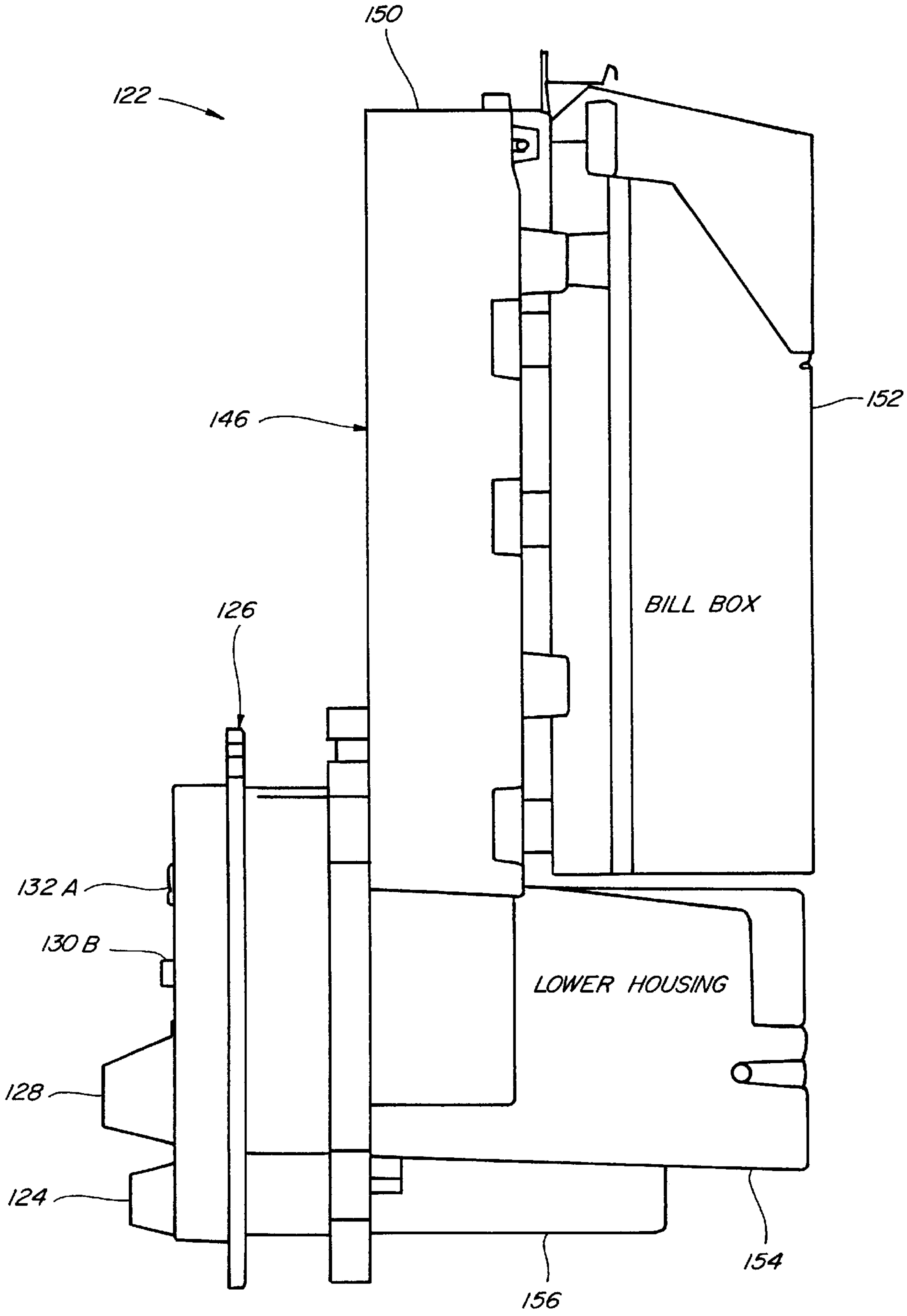
FIG. 4 is a side view of the integrated credit/information exchange module of FIG. 3.

FIG. 4 is a side view of the integrated module 122 illustrating both faceplate 126 and rear modular housing 146. The housing 146 includes an upwardly extending portion 150 having a bill storage box 152, a lower portion 154, and a card reader housing portion 156 which extends along the bottom surface of lower housing portion 154.

As illustrated in FIGS. 2–4, the integrated credit/information exchange module 122 is configured for retrofit installation into the bill acceptor slot 116 which is common to many existing and new vending machines. Accordingly, the integrated module 122 facilitates simple and convenient installation in such vending machines and at the same time provides for bill examination, card examination, message displays, and other advanced vending machine features as described in greater detail below.

Figure 5:
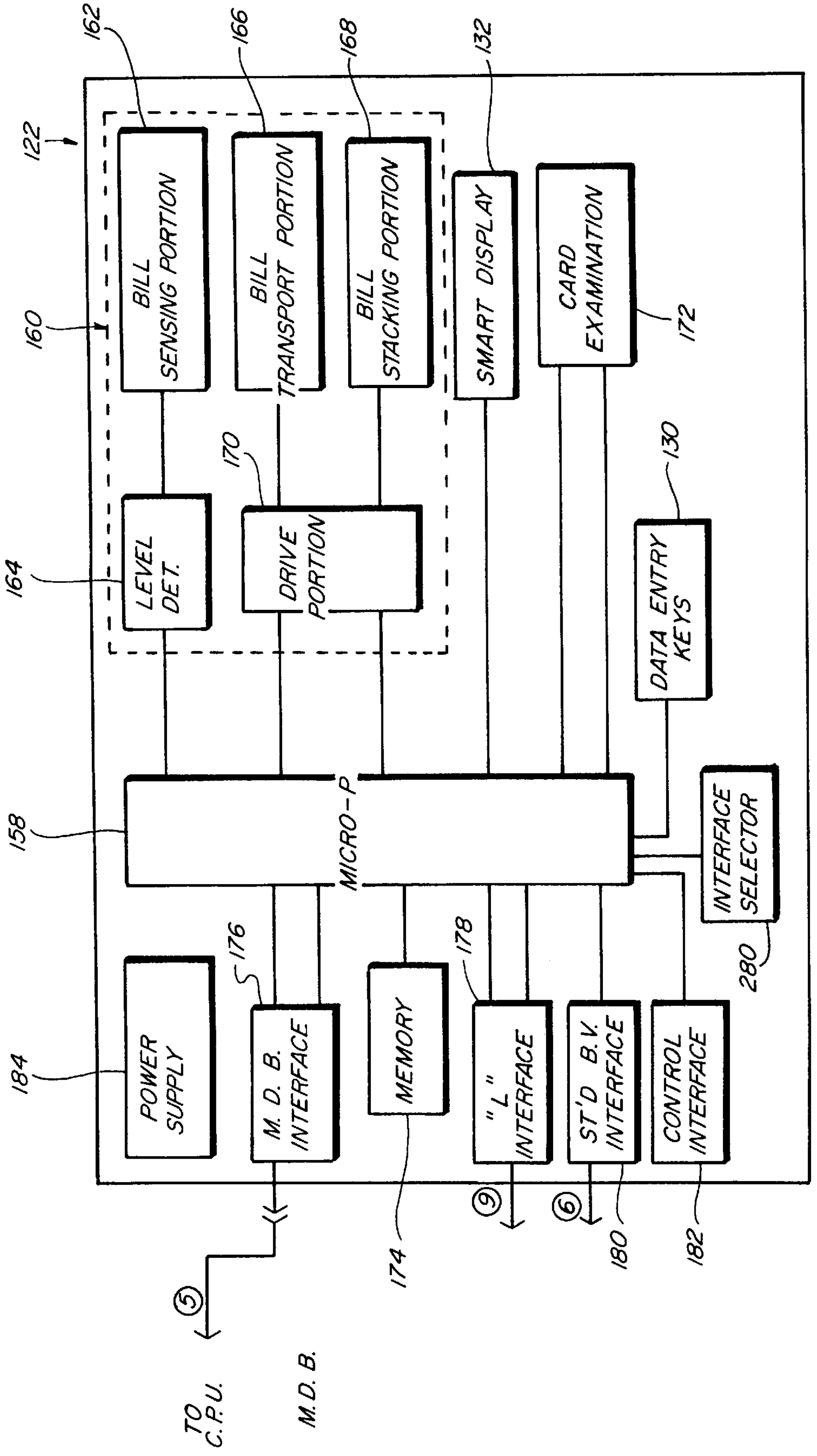
FIG. 5 is a block diagram illustration of the integrated credit/information exchange module.

The internal configuration of the integrated credit/information exchange module 122 is illustrated in block diagram form in FIG. 5. A microprocessor 158, or other processor means, controls a bill examination portion 160 having a bill sensing portion 162 which is controlled via a level detector 164. A bill transport portion 166 and a bill stacking portion 168 are controlled through a drive portion 170. A display portion 132, card examination portion 172, and data entry portion 130 are also connected to and controlled by the microprocessor 158. The common microprocessor 158 facilitates interaction between the various portions of the integrated module 122.

A memory storage portion 174 is also provided and may include known memory storage such as random access memory (RAM). Integrated module 122 includes multiple interfaces for connection of microprocessor 158 to various types of vending machines. A multi drop bus interface 176 having five connection lines, an L logic interface 178 having nine connection lines, and a B.V. bill validator interface 180 having 6 connection lines are included, each set of lines being connectable to a multi drop bus of a vending machine, an L logic connector of a vending machine, or a B.V. bill validator connector of a vending machine, respectively. One or more control interfaces such as control interface 182 are also provided. A power supply 184 provides power for the integrated module 122.

Figure 6:
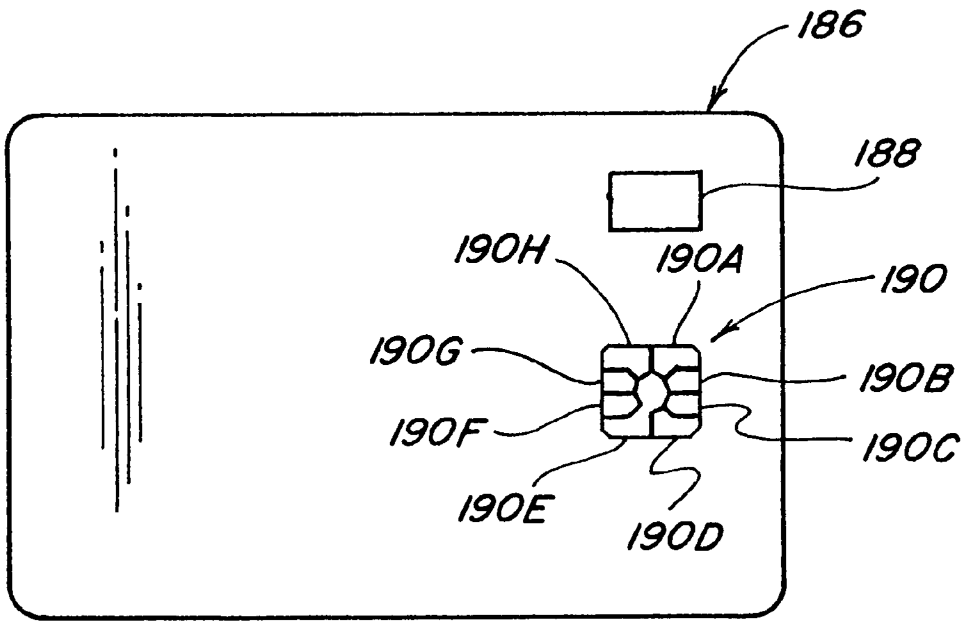
(PRIOR ART) Fig. 6
FIG. 6 is an illustration of a typical IC (integrated circuit) chip card.
Figure 7:
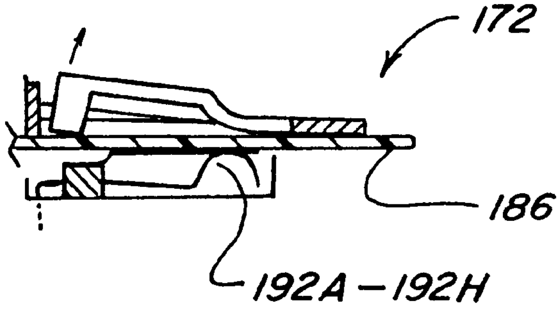
(PRIOR ART) Fig. 7
FIG. 7 is a partial side view of one construction of a card examination portion which could be utilized in the integrated module.

The integrated module 122 may be configured to operate with a variety of card types such as the IC chip card 186 illustrated in FIG. 6. The card 186 includes an IC chip 188, typically embedded in the plastic of the card 186 along with circuitry connecting the IC chip 188 to a contact portion 190. The contact portion 190 includes a plurality of contacts 190A–190H for interfacing the card 186 with the card examination portion 172. A card examination portion 172 which could be utilized in the integrated module 122 is described in U.S. Pat. No. 5,286,957 and is shown in the partial side view of FIG. 7, with card 186 inserted therein. Card examination portion 172 includes a plurality of contacts 192A–192H for contacting corresponding card contacts 190A–190H. Each of the examination contacts 192A–192H is connected to the integrated module microprocessor 158 for interface between the IC chip 188 and the microprocessor 158. The card 186 may be programmed as a cash card 186A or as a service card 186B. The numbers 186A and 186B are not shown in FIGS. 6 and 7 but will be used in this description to refer to a particular card type and throughout this description the term card 186 is considered to refer to the two card types collectively.

Figure 8:
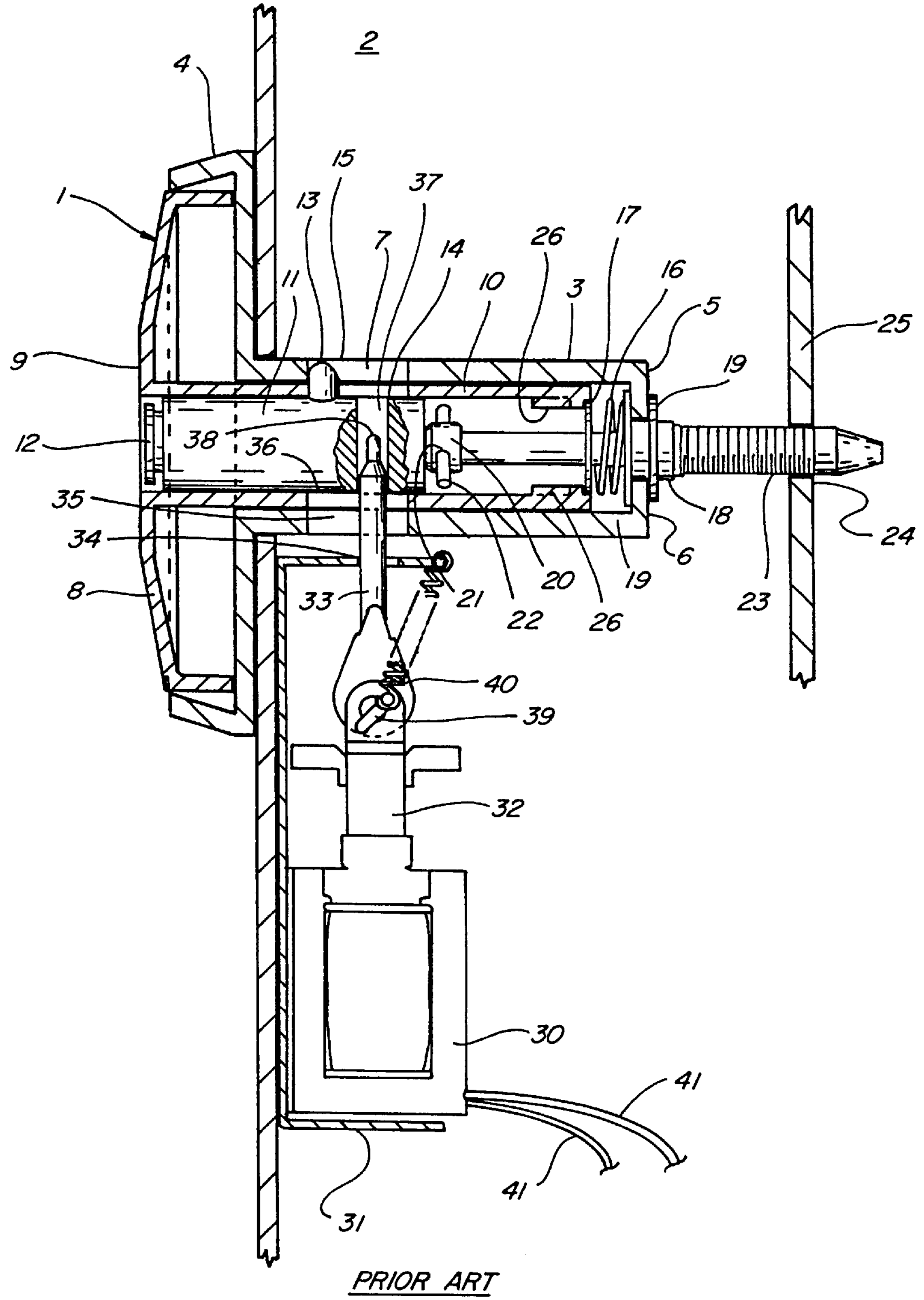
PRIOR ART Fig. 8
FIG. 8 is a partial cross-sectional top view of a door handle assembly including an electrically controlled locking mechanism.

The control interface 182 of FIG. 5 may be utilized to control the door handle assembly 144 where the assembly includes a solenoid type electrically controlled locking mechanism as described in U.S. Pat. No. 4,167,104 and illustrated in FIG. 8, a top view along line 8—8 of FIG. 2. The numbers associated with FIG. 8 correspond to the numbers contained in the description in U.S. Pat. No. 4,167,104. The processor portion 158 and the card examination portion 172 are operable to produce a control signal at the control interface 182 which causes current to flow through the leads 41 such as by controlling an electronic switch between the leads 41 and a power source. Alternatively, the control signal itself could act as the power source which causes the current to flow. Current flow through the leads 41 activates the solenoid 30 which results in a magnetic force which causes the dead bolt 33 to retract, allowing operation of the door handle assembly 144 so that the vending machine door may be opened. The control signal is produced at the control interface 182 when a properly encoded service card 186B is inserted in the card insertion opening 124. A variety of electrically controlled locking mechanisms could be controlled by the integrated module 122.

Figure 9:
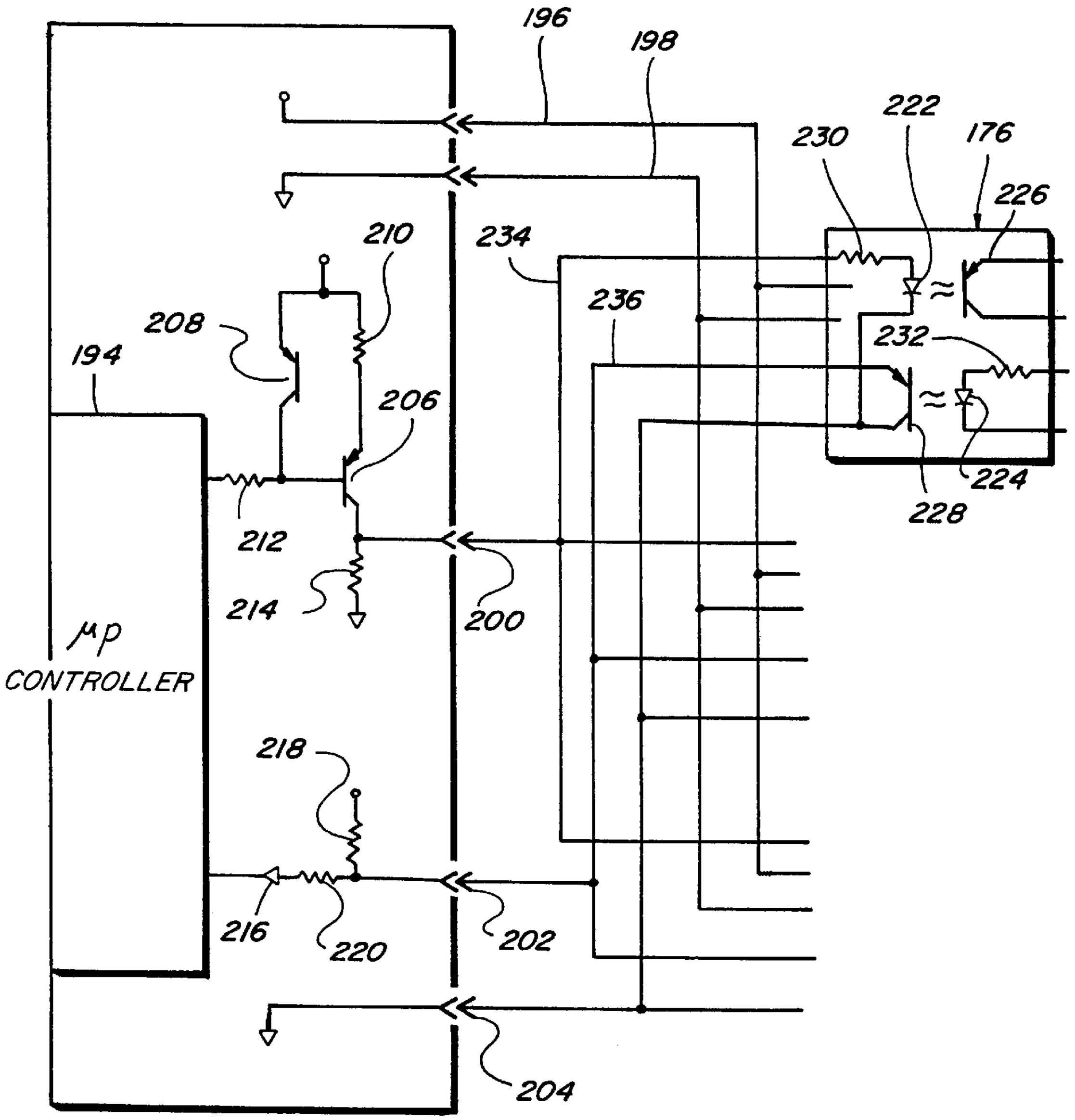
(PRIOR ART) Fig. 9
FIG. 9 is a schematic illustration of a multi drop bus and associated interface.

With respect to the multi drop bus interface 176 of integrated module 122, multi drop bus is a universal vending machine interface which is currently being adopted throughout the world. The multi drop bus standard is described in the National Automatic Merchandising Association International Multi-Drop Bus Interface Standard as prepared by the NAMA Vending Technology Standards Committee. As shown in FIG. 9, a vend control processor 194 is connected to a bus which includes five lines. Two of the bus lines are power lines 196, 198. The three communication lines include a master transmit line 200, a master receive line 202, and a communications common 204. The connection of vend control processor 194 to master transmit line 200 includes transistors 206, 208 and resistors 210, 212, 214. The connection of vend control processor 194 to master receive line 202 includes CMOS gate 216 and resistors 218, 220. Connection of the integrated module 122 to the vend control processor 194 is achieved through the multi drop bus interface 176 which includes two light emitting diodes 222, 224 and two corresponding phototransistors 226, 228, each diode and transistor forming an optical coupler pair. Each light emitting diode 222, 224 has a corresponding current limiting resistor 230, 232. Light emitting diode 222 connects via line 234 to master transmit line 200. Phototransistor 228 connects via line 236 to master receive line 202. A master-slave type operation exists with vend control processor 194 acting as master and integrated module 122 acting as slave. The optical coupler pair 224, 228 serves to transmit data in digital form from the integrated module 122 to the vend control processor 194. The optical coupler pair 222, 226 serves to transmit data from the vend control processor 194 to the integrated module 122.

Figure 10:
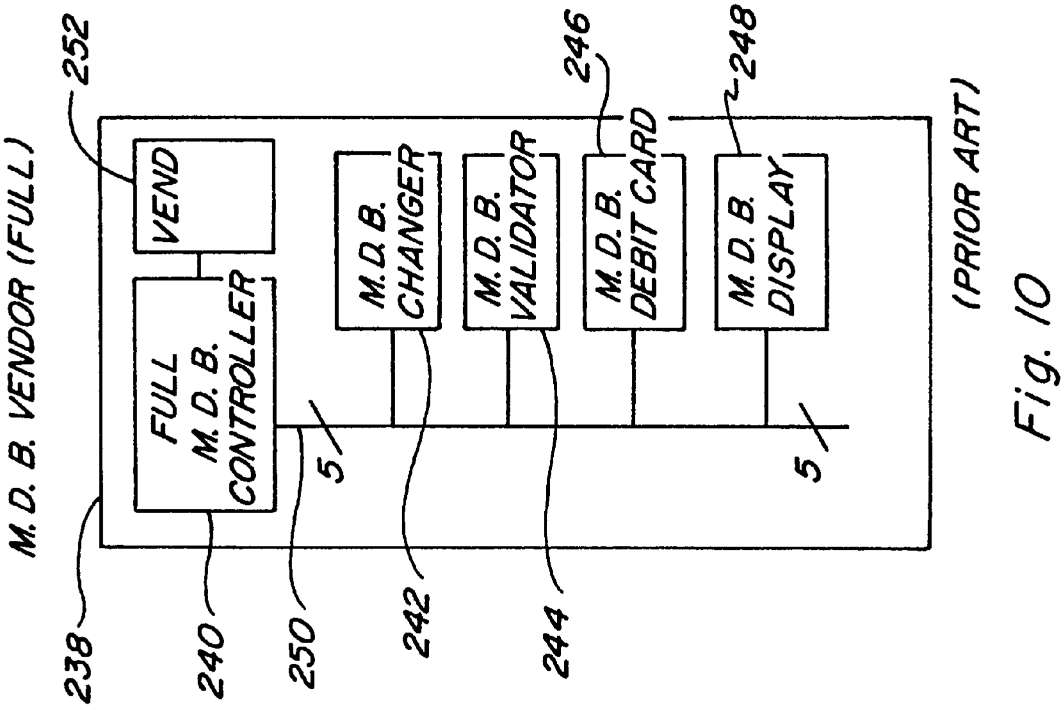
FIG. 10 is a block diagram illustration of a vending machine including a full multi drop bus controller.

FIGS. 10–13 illustrate various prior art vending machine configurations into which the integrated module 122 may be installed. FIG. 10 illustrates a full multi drop bus vending machine 238 including a full multi drop bus controller 240 which acts as master. Separate slave units such as coin changer 242, bill validator 244, card reader 246, and display 248 are all connected to multi drop bus lines 250. Each slave 242, 244, 246, 248 is an individual unit which can be separately installed or removed from the vending machine 238. However, implementation of a configuration such as vending machine 238 would require modification of the vending machine door as discussed above, reducing the space available for point-of-sale advertising and increasing the cost of installation. The controller 240 also operates vend portion 252 of vending machine 238.

Figure 11:
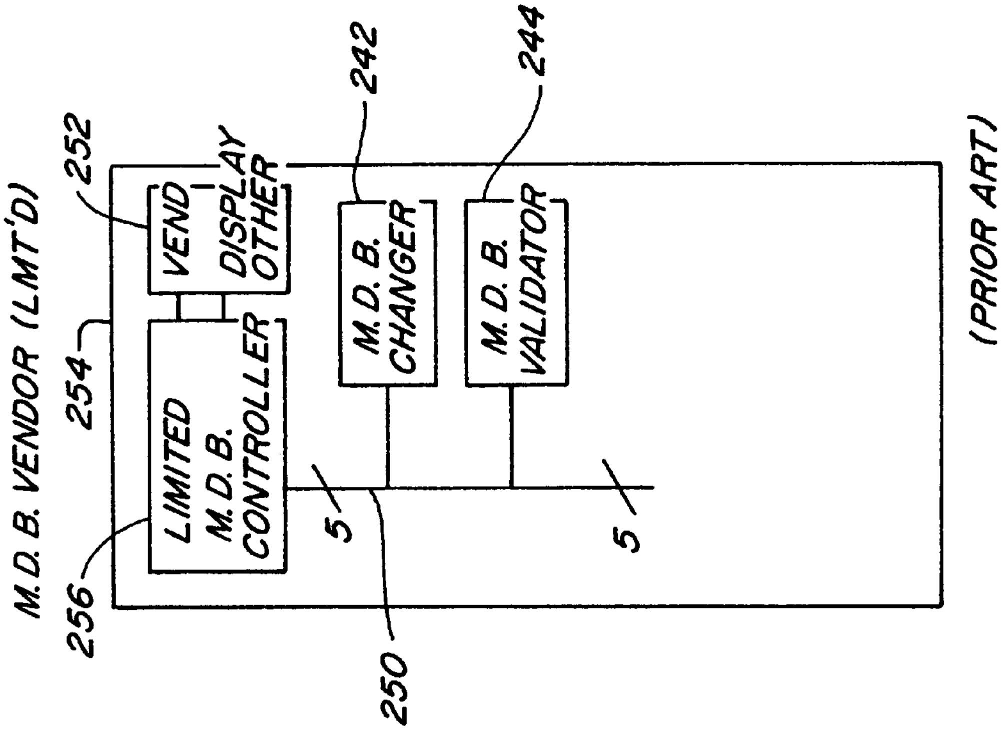
FIG. 11 is a block diagram illustration of a vending machine including a limited multi drop bus controller.

FIG. 11 also illustrates a vending machine 254 utilizing the multi drop bus interface lines 250. However, vending machine 254 contains only a limited multi drop bus controller 256. The controller 256 software is limited for controlling vend portion 252, coin changer 242, and bill validator 244. Particularly, the controller 256 is not configured for interface with card readers.

Figure 12:
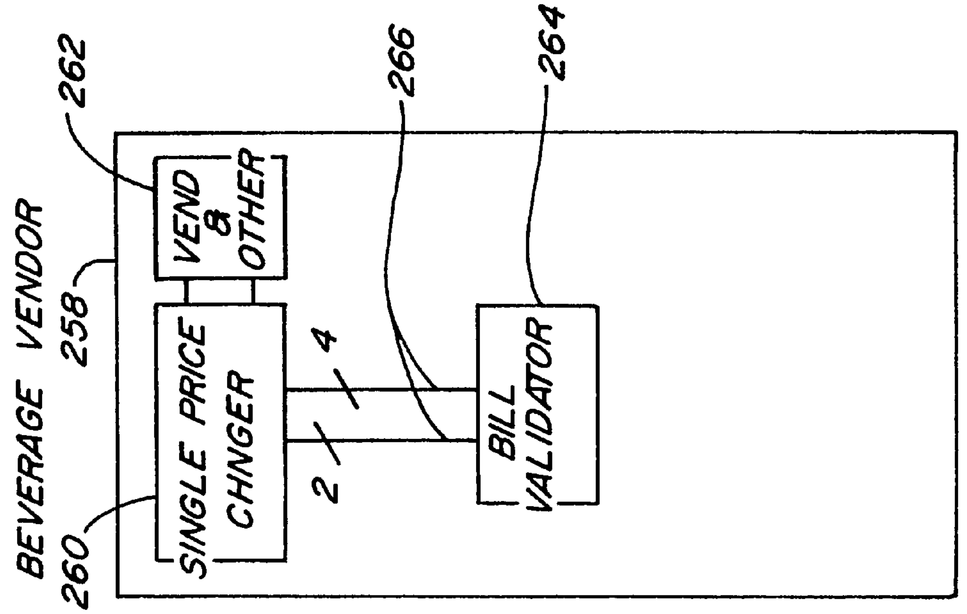
(PRIOR ART) Fig. 12
FIG. 12 is a block diagram illustration of a vending machine including a single price changer type controller.

FIG. 12 illustrates a typical beverage vending machine 258 including a single price changer type controller 260. The single price changer 260 software is configured for controlling a vend portion 262 and a standard bill validator 264 via B.V. bill validator interface lines 266. However, changer 260 is not configured for interface with card readers.

Figure 13:
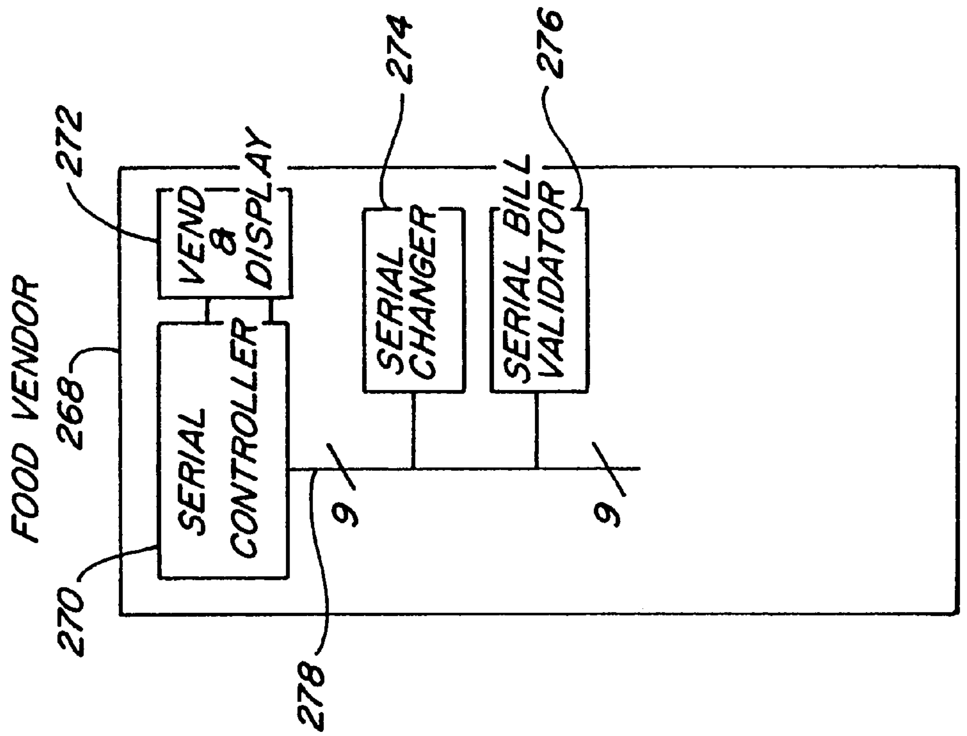
(PRIOR ART) Fig. 13
FIG. 13 is a block diagram illustration of a vending machine including a serial controller.

FIG. 13 illustrates a typical food vending machine 268 including a serial controller 270. The serial controller 270 software is configured for controlling vend portion 272. The serial controller 270 also controls a serial coin changer 274 and a serial bill validator 276 via L logic interface lines 278. Again, the controller 270 is not configured for interface with card readers.

The integrated credit/information exchange module 122, as shown in FIGS. 3–5, is configured for retrofit installation in each of the vending machines 238, 254, 258, and 268, to provide bill examination and card examination as well as additional features as desired by the particular vending machine owner or operator. With respect to vending machine 238, installation of the integrated module 122 involves removal of the bill validator 244, the card reader 246, and the display 248. The integrated module 122 is then connected to bus lines 250 by multi drop bus interface 176, shown in FIG. 5. The integrated module 122 effectively replaces each of the individual units and fits within the bill acceptor slot 116. Similarly, in vending machine 254, the bill validator 244 is removed and replaced by the integrated module 122.

In vending machine 258, the standard bill validator 264 is removed and the integrated module 122 is connected to single price changer 260 through a B.V. bill validator connector of the vending machine 258 and the B.V. bill validator interface 180, shown in FIG. 5. With respect to vending machine 268, the serial bill validator 276 is removed and replaced with the integrated module 122. The integrated module 122 is connected to the serial controller 270 through an L logic connector and the L logic interface 80, shown in FIG. 5. Installation of the integrated credit/information exchange module 122 in any one of vending machines 238, 254, 258, 268 enables such vending machines to operate as described below with respect to the vending machine applications.

Vending machine 238 includes full multi drop bus controller 240 which is configured to communicate with individual devices 244, 246, and 248. The multi drop bus configuration is a master-slave arrangement as hereinbefore mentioned. The master, or vending machine controller, polls the bus for peripheral activity. Each polling operation includes five bits which are designated as address bits. Each device which is connected to the bus is identified by a predefined code which corresponds to a particular series of address bits. The controller 240 sends out a polling signal on the master transmit line 200, shown in FIG. 9. The polling signal acts as a serial interrupt to each device on the bus and each device then reads in the address bits of the polling signal. A given device only reads in the remaining bits of the polling signal if the address bits correspond to that device's predefined code. When the integrated credit/information exchange module 122 replaces individual devices 244, 246, and 248, the microprocessor 158 of the integrated module 122 may be programmed to respond to several predefined codes. Particularly, in response to a bill validator coded polling operation of controller 240, microprocessor 158 responds with information from bill examination portion 160, shown in FIG. 5. Similarly, the microprocessor 158 responds to card reader coded polling operations and display coded polling operations based on information from card examination portion 172 and display portion 32, respectively. Thus, the integrated module 122 provides bill examination, card examination, display options, and other advanced features while fitting within the bill acceptor slot 116 so that no modification of the vending machine door is necessary.

Vending machine 254, shown in FIG. 11, includes limited multi drop bus controller 256. When the integrated module 122 replaces bill validator 244, the limited controller 256 may be replaced with a full multi drop bus controller 240 whereupon operation of vending machine 254 would be identical to the operation of vending machine 238 as described above. Optionally, the integrated module 122 can be programmed for operation with the limited controller 256. Particularly, communication between controller 256 and bill examination portion 160 would take place via the polling operation described above. However, because the controller 256 is not programmed to poll for card information, monetary information communicated from the card examination portion 172 of the integrated module 122 to the vending machine controller 256 will be presented to the controller 256 as if such information were coming from the bill examination portion 160. Thus, when the controller 256 sends out a bill validator coded polling signal, the microprocessor 158 may respond with appropriate information from the bill examination portion 160 or the card examination portion 172. This type of operation is achieved through appropriate programming of the microprocessor 158.

Similarly, in vending machines 258 and 268, information communicated between card examination portion 172 and single price changer 260 or serial controller 270, respectively, will be presented as if such information were coming from bill examination portion 160.

FIG. 14 is a flow chart 300 illustrating processing steps for the integrated credit/information exchange module 122 when installed in the full multi drop bus vending machine 238 or other type vending machine which is configured for operation with coin changer devices, bill validator devices, and card reader devices. The processing steps would be executed by the microprocessor 158 or some other processing means. Many variations are possible and many routines could be used in combination with such steps.

Once the integrated module 122 is installed, processing begins at 302. A message, such as those shown adjacent the message #1 designation, is displayed on the display screen 132A at step 304. Processing enters a looping routine of steps 306 and 308 during which the microprocessor 158 determines when a valid bill or valid card 186 has been inserted in the bill insertion opening 128 or the card insertion opening 124, respectively.

For a vend transaction involving only bill examination portion 160, upon insertion of a valid bill decision step 308 is satisfied and the value of the inserted bill is credited to the vending machine controller, such as full multi drop bus controller 240, at step 310. If the controller 240 signals a successful vend transaction, decision step 312 is satisfied and a message such as message #3, indicating product delivery, is displayed on display screen 132A at step 314, and processing ends at step 316. If decision step 312 is not satisfied, indicating that no successful vend transaction was made, a message is displayed at step 318. Such a message might take the form of those listed adjacent the message #2 designation, notifying the customer to make a selection, that there is insufficient credit for the transaction, or that more credit should be added. Once the vend transaction is successful and decision step 312 is satisfied, steps 314 and 316 are reached as described above. This sequence would allow a customer to purchase a product using ordinary bill type currency.

For a transaction involving card examination portion 172, upon insertion of a valid card 186 in opening 124 decision step 306 is satisfied. The integrated module microprocessor 158 determines the value of the card 186 and credits the full value to the vending machine controller 240 at step 320. If a transaction is completed, decision step 322 is satisfied and any credit value remaining on the controller 240 is encoded back onto the card 186 at step 324.

In the case of a simple product purchase operation, decision step 322 is satisfied based on a vend control or other data signal from the controller 240 that an appropriate valued product was selected or that a product was delivered. The product delivery message is displayed at step 326, and processing ends at step 328. If decision step 322 is not satisfied, one of the instruction messages adjacent message #2 is displayed at step 330. Decision step 332 is satisfied by the insertion of a valid bill and the bill value is credited to controller 240 at step 334. Upon completion of a successful transaction processing moves to steps 324, 326, and 328 as described above.

A completed transaction could also be indicated by the removal of the card 186 by the customer. In this case, if the customer begins to remove the card 186 decision step 322 is immediately satisfied and the value in controller 240 is written to the card 186 at step 324. If a customer removes the card 186 before step 324 is completed, a message is displayed instructing the customer to reinsert the card 186 so that processing can be completed.

These processing steps allow the card holder to convert both coins and bills to card value without having to return to a central location. For example, the following sequences are possible. The customer inserts the valid card 186 and decision step 306 is satisfied. The full value of the card 186 is then credited to the controller 240 and processing moves to decision step 322. If the customer removes the card 186 without purchasing a product and without inserting any bills or coins, the value encoded on the card 186 after revaluation will be equal to the value when inserted. If the customer adds value in bill form the bill value is credited to the controller 240 at step 334. Further, if the customer adds value in coin form, the coin value is automatically credited to the controller 240 as a result of the protocol between the changer 242 and the controller 240. If the card 186 is then removed, the value written to the card 186 at step 324 is the initial card value plus any added bill or coin value. This sequence would allow a customer to add value to the card 186 without purchasing a vending machine product. In these card revaluation sequences, the pressing of either data entry key, 130A or 130B, could also serve as an indication of a completed transaction, satisfying decision step 322.

In a product purchase involving both the card 186 and inserted bills or coins, a completed transaction could be indicated by product selection or delivery. In such cases the credit value in controller 240 is reduced by the cost of the purchased product. Therefore, the value written to the card 186 at step 324 is the initial value of the card 186 plus any added bill or coin value minus the cost of the purchased product. This sequence would allow a customer to add change due from a purchase to the value of the card 186 so that the card holder does not have to carry a multitude of coins.

Numerous messages may be implemented on display screen 132A during the above processing steps, including those listed adjacent the other messages designation of FIG. 14. The messages displayed correspond to the particular sequence of processing steps and routines used to implement those steps. It is understood that messages could be displayed at any processing step. The ability to include such messages enhances the vending machine's user friendliness, increasing the range of features that may be provided by the integrated credit/information exchange module 122.

Figure 15A:
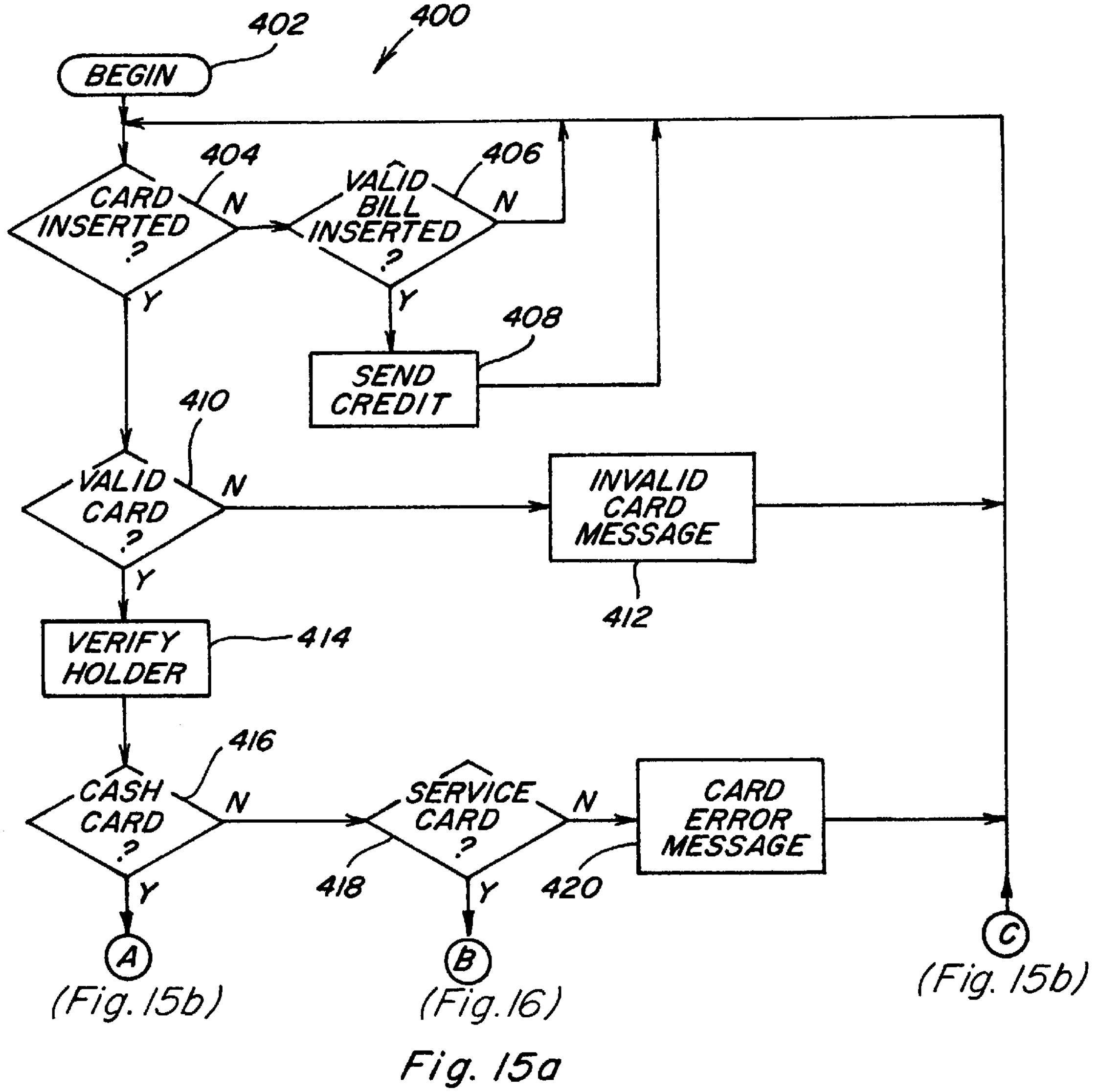
FIG. 15*a*–15*b* are a flow chart illustration of processing steps for the integrated credit/information exchange module when installed in any of the vending machines of FIGS. 11–13.
Figure 15B:
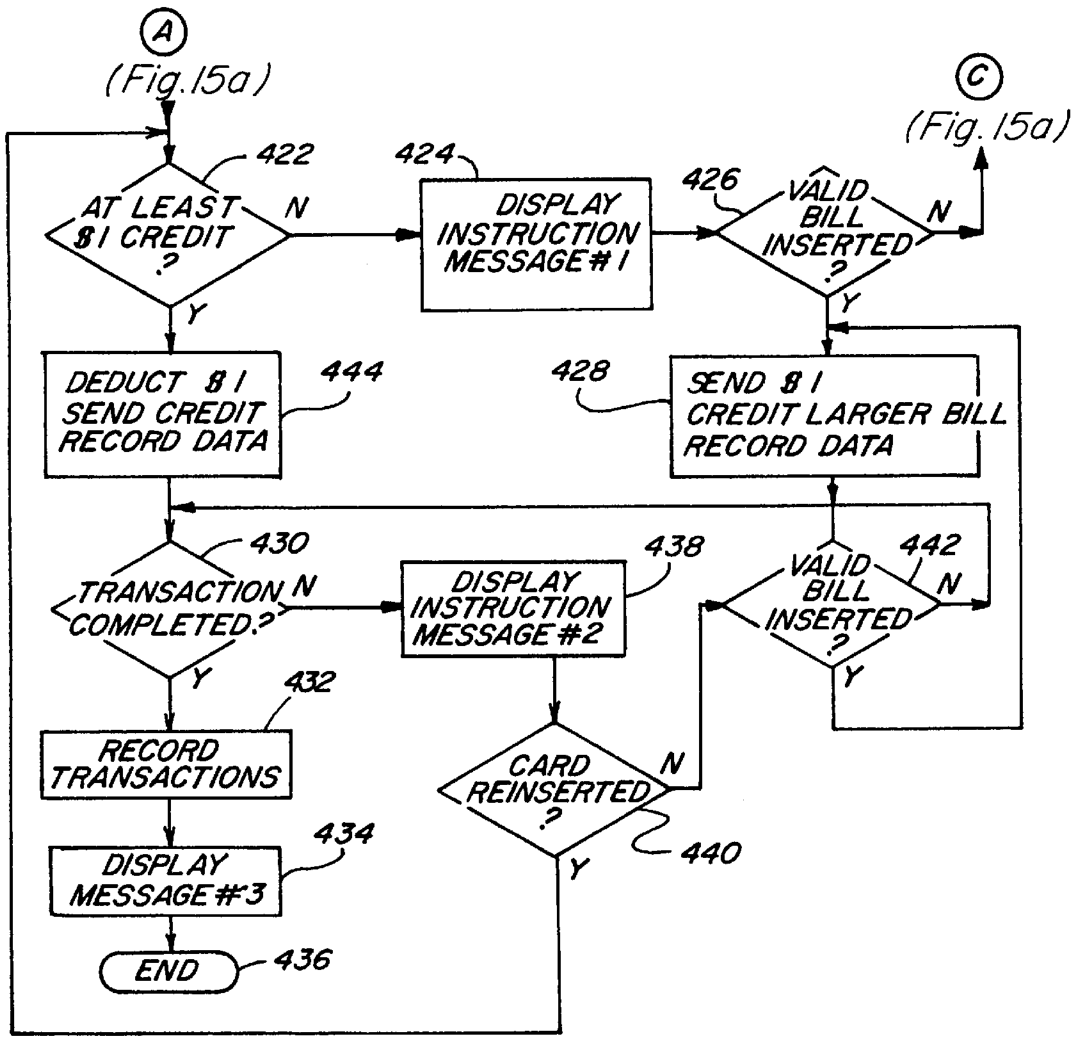

FIG. 15 is a flow chart 400 illustrating processing steps for the integrated module 122 when installed in vending machines such as 254, 258 and 268 which are not configured for communication with a card reader. Again, the processing steps would be executed by the microprocessor 158 or some other processing means. Also, many variations are possible and many routines could be used in combination with such steps. While the following flow chart 400 description is made with respect to vending machine 258, it is understood that flowchart 400 also applies to other vending machines such as 254 and 268.

Once the integrated credit/information exchange module 122 is installed, processing begins at 402. Processing enters a looping routine of steps 404 and 406 during which the microprocessor 158 monitors, or waits for a signal from, bill examination portion 160 and card examination portion 172. If a valid bill is inserted in opening 128, decision step 406 is satisfied and the bill value is credited to the vending machine controller, in this case single price changer 260, at step 408. Once the value is credited the looping routine is reentered. This sequence would allow for a simple product purchase transaction involving only the bill examination portion 160 of the integrated module 122.

If a card 186 is inserted in the card insertion opening 124 decision step 404 is satisfied and the card 186 is examined to assure that it is a valid card at step 410. If the card 186 is not a valid card, an invalid card message is displayed at step 412 and the looping routine is reentered. If the card 186 is a valid card, decision step 410 is satisfied and the customer or card holder is verified at step 414. Verification could take place through use of a personal identification number (PIN) requirement. If such a step is included, each card 186 can be programmed with a particular PIN which the holder or customer is required to input using data entry keys 130A and 130B. This feature would allow the vending machine operator to implement a security requirement if desired.

Once the customer or holder is verified, the type of card is determined at steps 416 and 418. If the card 186 is not classified as a cash card 186A or a service card 186B an error message is displayed at step 420 and the looping routine is reentered.

If step 416 is satisfied, indicating insertion of a cash card 186A, the monetary value encoded on the cash card 186A is examined to assure at least one dollar credit remains at step 422. If the cash card 186A has a value less than one dollar, message #1 is displayed at step 424. Message #1 tells the customer the value left on the cash card 186A and instructs the customer to add bills or use only coins. If a valid bill is not inserted, decision step 426 is not satisfied and the looping routine is reentered.

If a valid bill is inserted, decision step 426 is satisfied and one dollar credit is sent to changer 260 and any value of the added bill which is over one dollar is added to the value encoded on the cash card 186A at step 428. Upon completion of a transaction, decision step 430 is satisfied and at step 432 the transaction or transactions are stored to memory 174 for later retrieval. A product delivery or transaction complete message is displayed at step 434 and processing ends at step 436.

If decision step 430 is not satisfied, a message to reinsert the cash card 186A is displayed at step 438. If the cash card 186A is reinserted decision step 440 is satisfied and processing returns to step 422. If the cash card 186A is not reinserted decision step 440 is not satisfied and processing moves to decision step 442 to determine if a valid bill has been inserted. If no valid bill is inserted, processing returns to step 430. Insertion of a valid bill satisfies decision step 442 and processing moves to step 428.

With respect to decision step 422, if the value of the cash card 186A is at least one dollar, one dollar is credited to the changer 260 and accordingly deducted from the value encoded on the cash card 186A at step 444, and processing moves to step 430.

Flow chart 400 illustrates that value can be added to the value encoded on the cash card 186A during a product purchase by inserting valid bills in the bill insertion opening 128. The sequence of steps for such an operation might be 404, 410, 414, 416, 422, 424, 426, 428, 430, 432, 434, 436. An alternative sequence of steps might be 404, 410, 414, 416, 422, 444, 430, 438, 440, 442, 428, 430, 432, 434, 436.

By using more advanced routines, value could also be added to the cash card 186A without requiring a product purchase. During such sequences, step 428 might include a routine which displays a question to the customer as to whether he wishes to purchase a product or merely add value to the card. The customer would respond by using data entry keys 130A, 130B. If a customer were to respond that no product purchase was desired, no credit would be sent to changer 260 and decision step 430 would be automatically satisfied.

Figure 16:
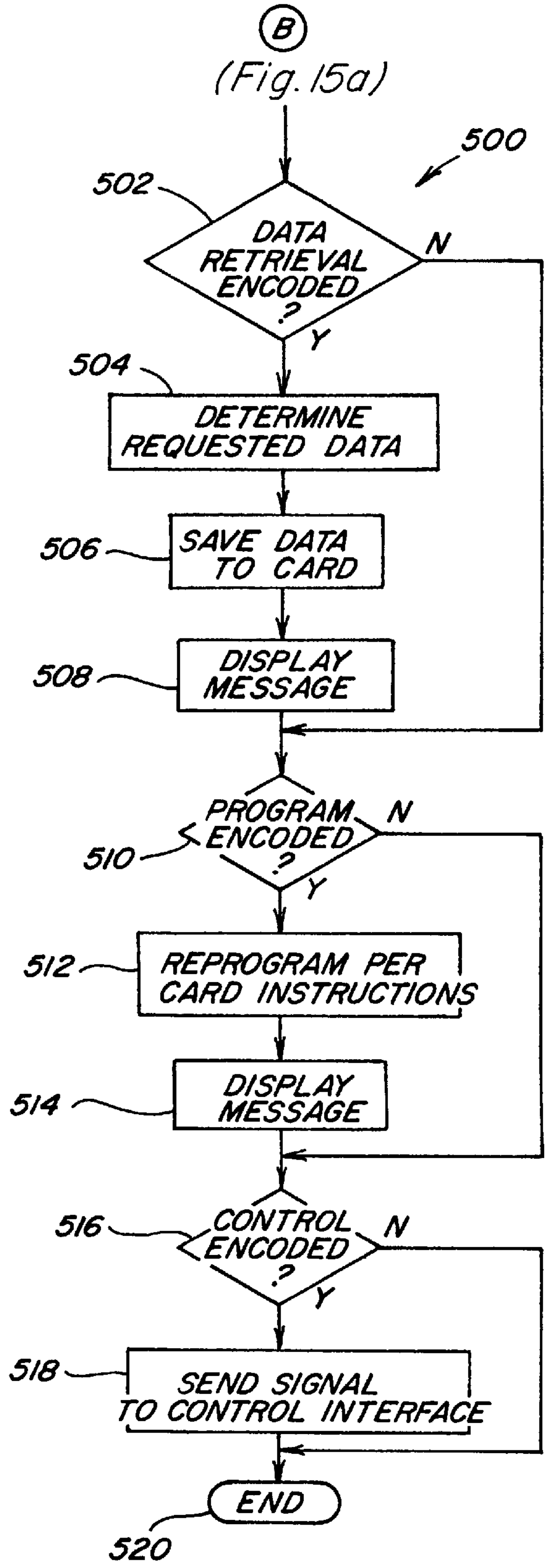
FIG. 16 is a flow chart illustration of processing steps for implementing service card features.

With respect to decision step 416, if the inserted card 186 is a service card 186B step 416 is not satisfied but step 418 is satisfied and processing moves to flow chart 500 which is illustrated in FIG. 16. The service card 186B is examined at step 502 to determine whether or not the card is encoded to retrieve data. Data to be retrieved could include information such as, for example, total number of sales, number of sales by bill, number of sales by card, number of each product sold, and number of each product remaining. Of course, any information stored in the memory 174 could be retrieved. If the service card 186B is encoded to retrieve data, step 502 is satisfied and at step 504 the requested data is determined and then encoded onto the service card 186B at step 506. A message is displayed at step 508 indicating that the data retrieval is complete and processing moves to step 510. Data saved on the service card 186B can later be recovered by inserting the service card 186B into a compatible device such as a personal computer. This feature allows a vending machine operator to retrieve data by a quick and simple method, requiring no more than an appropriately programmed service card 186B.

After step 508, or if decision step 502 is not satisfied, processing moves to step 510 where the service card 186B is examined to determine if it is encoded for reprogramming. If decision step 510 is satisfied, reprogramming takes place at step 512 according to the card instructions. Reprogramming options are numerous, including changing the messages displayed, changing the language in which messages are displayed, or reprogramming the microprocessor 158 for operation in a different currency environment. Upon completion of the reprogramming operation a message is displayed at step 514 indicating that reprogramming is completed and processing moves to step 516. Such a reprogramming feature facilitates reprogramming without replacing any components and without requiring the vending machine to be opened.

After step 514, or if decision step 510 is not satisfied, processing moves to step 516 where the service card 186B is examined to see if it is encoded for a control operation. If step 516 is satisfied a control signal is sent to the control interface according to card instructions at step 518. As described above, this control signal can be utilized to control an electrical locking mechanism of the vending machine door. After step 518, or if step 516 is not satisfied, the service card routine ends at step 520.

With respect to flow chart 500, it is understood that similar processing steps could be included in the flow chart 300 of FIG. 14. In a full multi drop bus vending machine data retrieval may already be provided by a separate jack available for connection with a personal computer. However, it may be desirable to include such processing steps in order to simplify the data retrieval process. It is also understood that the holder verification step 414 of flow chart 400 could also be included in the flow chart 300.

In flow chart 300 it is contemplated that end processing steps 316 and 328 would typically involve returning to step 304. Similarly, in flow charts 400, and 500 it is contemplated that end steps 436 and 520 would typically involve returning to step 404.

While flow chart 400 makes reference to one dollar at steps 422, 444, and 428, it is understood that this value could be changed to correspond to any currency environment, including foreign currencies. For example, for use on German currency market, these steps might refer to one Mark.

It is understood that numerous operations and routines could be used to implement advanced vending machine features such as card revaluation, data retrieval, reprogramming, message displays, and control operations. Additional processing steps and routines could also be included depending on the features desired by the vending machine owner or operator.

Similar programming routines can be utilized when the integrated credit/information exchange module 122 is retrofit into vending machines 254, 258 and 268. In each case, some portions of the programs may have to be modified to account for the differences between limited controller 256, single price changer 260, and serial controller 270, particularly those portions of the programs in which information is transferred between the microprocessor 158 and controller 256, 260, or 270. For example, in vending machine 258 bill value or card value is communicated to the controller 260 by using unit value pulses the number of which represent the dollar value, typically one pulse for one dollar, two pulses for two dollars, and so on.

All required programs can be incorporated in the integrated module 122. An interface selector 280, shown in FIG. 5, can also be provided on the integrated module 122. The interface selector 280, possibly in the form of a dip switch, may be set by the installer so that the selector 280 setting corresponds to the vending machine type into which integrated module 122 is being installed. The interface selector 280 controls the configuration of the microprocessor 158 so that the appropriate programming routines for the vending machine type are implemented and so that signals are transmitted to the appropriate interface. Alternatively, the integrated module 122 can be preprogrammed to configure itself upon initial start up according to the vending machine type in which it has been installed, such as by detecting the interface to which it has been connected.

From the preceding detailed description, it is evident that the objects of the invention are attained. In particular, an integrated credit/information exchange module 122 which is retrofittable into numerous vending machine types is provided, eliminating space limitation problems and reducing the cost associated with implementing both card examination and bill examination in a vending machine. The integrated credit/information exchange module 122 thus enhances the vending options available to the vending machine customer, including the ability to purchase a vending machine product with bill type currency, with a cash card 186A, or through a combination of the two. The integrated module 122 is also programmable for implementation of various advanced vending machine features, including card revaluation, data retrieval, reprogramming, and control operations. Card revaluation is simplified for the vending machine customer. Further, data retrieval and reprogramming capabilities are enhanced for the vending machine operator. It is understood that the number of advanced vending machine operations implemented can be increased or decreased depending upon the desires of the vending machine operator.

Although the invention has been described and illustrated in detail, it is to be clearly understood that the same is intended by way of illustration and example only and is not to be taken by way of limitation. For example, it is understood that the integrated module 122 can be implemented with various types of cards 186 and card examination portions 172, including debit cards and credit cards having magnetic stripe interfaces as well as cards and card readers configured for contactless communication through the use of inductive means. It is further contemplated that other configurations for bill examination portion 160 are possible. While microprocessor 158 is shown in FIG. 4, it is understood that other processing means may be utilized to implement the integrated module 122.

With respect to features such as card revaluation, data retrieval, reprogramming, and control operations, it is also contemplated that numerous programming routines for the implementation of the advanced vending machine operations are possible. Further, while the use of four interface types has been described herein, it is understood that different or additional interfaces could be included for installing the integrated module 122 into various other types of vending machines. Accordingly, the spirit and scope of the invention are to be limited only by the terms of the appended claims.

What is claimed is:

1. An integrated credit/information exchange module installed within a vending machine, the vending machine including a door handle assembly for opening the vending machine for access to the interior thereof, the door handle assembly including a latching mechanism to latch the vending machine closed, and an electrically controllable locking mechanism for preventing operation of the door handle assembly to open the vending machine, said integrated credit/information exchange module comprising a modular housing having a faceplate, said integrated credit/information exchange module including a bill examination portion, a card examination portion, a processor portion for controlling both said bill examination portion and said card examination portion, a display portion, and an interface portion operatively connected to the vending machine for passing information thereto, said faceplate positioned within a bill acceptor slot of the vending machine and including a bill insertion opening therethrough, a card insertion opening therethrough, and a display opening therethrough, said processor portion and said bill examination portion being operable with one another to control the examination and verification of a bill inserted into said bill insertion opening and to provide to said interface portion an output signal representative of the value of the bill examined, said processor portion and said card examination portion operable with one another to control examination of a card inserted into said card insertion opening and to provide to said interface portion an output signal in response to information encoded on the card, said display portion including a multi-character display screen located within the display opening of said faceplate, said processor portion connected for controlling said display portion, said interface portion including a control interface connected to the electrically controllable locking mechanism of the vending machine such that the locking mechanism is controllable by a signal present thereat, said processor portion and said card examination portion operable to produce at said control interface, in response to information encoded on the card, a signal to effect operation of the locking mechanism to permit operation of the door handle assembly when a properly encoded card is inserted into said card insertion opening, so that the door handle assembly can then be operated to permit access to the interior of the vending machine.

2. An integrated credit/information exchange module according to claim 1 wherein said interface portion includes a plurality of standard vending machine compatible interfaces, one of which is connected for passing information to a controller of the vending machine.

3. An integrated credit/information exchange module according to claim 2 wherein said plurality of standard vending machine compatible interfaces includes a multi drop bus interface, an L logic interface, and a B.V. bill validator interface.

4. An integrated credit/information exchange module according to claim 2 including an interface selector which is set so as to direct vending machine communication signals to the one vending machine compatible interface which is connected to the vending machine controller.

5. An integrated credit/information exchange module according to claim 2 wherein said processor portion is programmed to configure itself upon initial start up according to the vending machine type in which it has been installed by detecting the vending machine compatible interface to which it has been connected.

6. An integrated credit/information exchange module according to claim 1 wherein said processor portion and said card examination portion are operable with one another to provide a signal to said display portion in response to information encoded on the card.

7. An integrated credit/information exchange module according to claim 1 wherein said modular housing is sized and configured to be retrofittable in the vending machine to replace a standard bill validator.

8. An integrated credit/information exchange module according to claim 1 wherein said card examination portion and said processor portion are operable to alter the encoding of the card inserted into the card insertion opening.

9. An integrated credit/information exchange module according to claim 8 wherein said processor portion is responsive to signals provided from the vending machine to said interface portion to alter the encoding of the card.

10. An integrated credit/information exchange module according to claim 8, further comprising at least one data entry key connected to said processor portion, said processor portion operable with said card examination portion to alter encoding of the card in response to a signal provided from the data entry key, and wherein said faceplate includes a further opening therethrough, the data entry key being positioned within the further opening of said faceplate.

11. An integrated credit/information exchange module according to claim 1 wherein the vending machine includes a vend control processor and a connector operatively connecting the vend control processor to said interface portion of said integrated credit/information exchange module, the vend control processor operable to receive information provided to said interface portion and to generate and communicate to said interface portion vend control and data signals, said processor portion of said integrated credit/information exchange module operable to receive the vend control and data signals communicated to said interface portion by the vend control processor, said processor portion responsive to predetermined vend control and data signals to control the operation of said bill examination portion and said card examination portion.

12. An integrated credit/information exchange module according to claim 1 wherein said card examination portion and said processor portion are operable to alter the encoding of the card inserted into the card insertion opening, said bill examination portion and said processor portion operable to produce, at said interface portion, a signal representative of the value of the bill inserted into said bill insertion opening, said card examination portion and said processor portion operable to effect a credit value examination of a card inserted into said card insertion opening to determine whether a cash value encoded thereon is at least equal to a pre-established non-zero value and, if so, to produce, at said interface portion, a signal which is representative of said pre-established non-zero value and also to alter the encoding of the card to reduce the cash value encoded thereon by an amount corresponding to said pre-established non-zero value.

13. An integrated credit/information exchange module according to claim 1 wherein said interface portion includes a B.V. bill validator interface connected to the vending machine and said card examination portion and said processor portion are operable to alter the encoding of the card inserted into the card insertion opening, said bill examination portion and said processor portion operable to produce, at said B.V. bill validator interface, unit value pulses the number of which are representative of the unit value of the bill inserted into said bill insertion opening, said card examination portion and said processor portion operable to effect a credit value examination of a card inserted into said card insertion opening to determine whether a cash value encoded thereon is at least equal to a pre-established non-zero multiple of unit values and, if so, to produce, at said B.V. bill validator interface, unit value pulses the number of which are equal to said pre-established non-zero multiple of unit values and also to alter the encoding of the card to reduce the cash value encoded thereon by an amount corresponding to the value represented by said pre-established non-zero multiple of unit values.

14. An integrated credit/information exchange module according to claim 13 wherein said card examination portion and said processor portion are operable to detect the removal and reinsertion of the card into said card insertion opening to effect a further credit value examination of the card, whereby further unit value pulses are produced at said B.V. bill validator interface if the cash value of the altered encoding of the card is at least equal to said pre-established non-zero multiple of unit values.

15. An integrated credit/information exchange module according to claim 1, further comprising a memory portion connected to said processor portion, said processor portion operable to retrieve information stored in said memory portion in response to instructions encoded on the card, said processor portion operable with said card examination portion to encode said retrieved information onto said card.

16. An integrated credit/information exchange module according to claim 1 wherein said processor portion is operable with said card examination portion to detect if an inserted card is reprogram encoded, said processor portion operable to alter a portion of its programming in response to instructions encoded on a given reprogram encoded card.

17. An integrated credit/information exchange module according to claim 1 wherein said card examination portion includes a plurality of contact members configured for engaging a corresponding plurality of contacts located on the card.

18. An integrated credit/information exchange module according to claim 1 wherein the vending machine includes a multi drop bus communication system including a multi drop bus controller connected to a bus, the multi drop bus controller operable to establish polling signals on the bus, each polling signal including device specific address information associated therewith, the interface portion of the integrated module including a multi drop bus interface which is connected to the bus, and wherein the processor portion of the integrated module is operable to respond to at least two different device specific polling signals, including polling signals of the type including bill validator specific address information and polling signals of the type including card reader specific address information.

19. An integrated credit/information exchange module according to claim 18 wherein the processor portion of the integrated module is further operable to respond to polling signals of the type including display specific address information.

20. An integrated credit/information exchange module installable in a multi drop bus vending machine, comprising a modular housing and a faceplate and being sized and configured to be installable in a standard bill acceptor slot in the vending machine, said integrated credit/information exchange module including a bill examination portion, a card examination portion, a processor portion for controlling both said bill examination portion and said card examination portion, and a multi drop bus interface portion operatively connectable to a bus of the multi drop bus vending machine for communication with a multi drop bus controller of the vending machine, said faceplate including a bill insertion opening extending therethrough and a card insertion opening extending therethrough, the processor portion programmed to respond to at least two different device specific polling signals received via the multi drop bus interface including bill validator device specific polling signals and card reader device specific polling signals, said processor portion and said bill examination portion being operable with one another to control the examination and verification of a bill inserted into said bill insertion opening, said processor portion operable to provide to said multi drop bus interface portion, in response to a bill validator device specific polling signal, a signal representative of the value of the bill examined, said processor portion and said card examination portion being operable with one another to control examination of a card inserted into said card insertion opening, said processor portion operable to provide to said multi drop bus interface portion, in response to a card reader device specific polling signal, a signal representative of information stored on the card inserted into the card insertion opening.

21. An integrated credit/information exchange module in accordance with claim 20 wherein said processor portion is operable to determine if a card inserted into the card insertion opening includes data retrieval instructions and, if so, to retrieve data from memory associated therewith and to effect, in conjunction with the card examination portion, writing of the retrieved data to the inserted card.

22. An integrated credit/information exchange module in accordance with claim 21 wherein said processor portion is operable to determine if a card inserted into the card insertion opening includes reprogramming instructions and, if so, to alter a portion of its programming in response to the reprogramming instructions encoded on the card.

23. The integrated credit/information exchange module of claim 20 further including a display portion and wherein said faceplate includes an opening therein for accommodating said display portion, said display portion being operably connected to said processor portion and responsive thereto.

24. The integrated credit/information exchange module of claim 23 wherein said display portion includes a display screen.

25. The integrated credit/information exchange module of claim 23 wherein said display portion includes a multi-character display device.

26. The integrated credit/information exchange module of claim 23 wherein said processor portion and said card examination portion are operable with one another to provide a signal to said display portion in response to information encoded on the card.

27. The integrated credit/information exchange module of claim 26 wherein the vending machine includes a manually operable door handle assembly for opening the vending machine for access to products, the door handle assembly including a stud projection extending into the vending machine and a latching mechanism for cooperatively engaging the stud portion to latch the vending machine closed, the stud projection being rotatably operable to engage and disengage the latching mechanism, a dead bolt assembly cooperatively engageable with and disengageable from the stud projection to effectively inhibit the rotational operation thereof, the dead bolt assembly being connectable to said control interface and controllable by the signal present thereat, said processor portion and said card examination portion operable to produce at said control interface a signal to effect disengagement of the dead bolt assembly with the stud portion when a properly encoded card is inserted into said card insertion opening, so that the door handle assembly can then be operated to permit access to the products therein for restocking purposes.

28. The integrated credit/information exchange module of claim 20 wherein the vending machine includes a door handle assembly for opening the vending machine for access to the interior thereof, the door handle assembly including a latching mechanism to latch the vending machine closed, and an electrically controllable locking mechanism for preventing operation of the door handle assembly to open the vending machine, the locking mechanism being connectable to said control interface and controllable by the signal present thereat, said processor portion and said card examination portion operable to produce at said control interface a signal to effect operation of the locking mechanism to permit operation of the door handle assembly when a properly encoded card is inserted into said card insertion opening, so that the door handle assembly can then be operated to permit access to the products therein for restocking purposes.

29. The integrated credit/information exchange module of claim 20 further including a data entry portion and wherein said faceplate includes at least one opening therethrough to accommodate said data entry portion, said data entry portion operably connectable to said processor portion.

30. The integrated credit/information exchange module of claim 29 wherein said data entry portion includes at least one user actuatable data entry key.

31. The integrated credit/information exchange module of claim 29 wherein said data entry portion includes a plurality of data entry keys.

32. The integrated credit/information exchange module of claim 29 wherein said processor portion is operable to alter, in response to a signal provided from said data entry portion, the encoding of an encoded card inserted into said card insertion opening.

* * * * *